(12) United States Patent
Fujii

(10) Patent No.: US 7,998,610 B2
(45) Date of Patent: Aug. 16, 2011

(54) ELECTRIC POWER SOURCE PROVIDING A BATTERY CASE WITH AN INTERMEDIARY DUCT

(75) Inventor: Kazuhiro Fujii, Taka-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 1045 days.

(21) Appl. No.: 11/882,111

(22) Filed: Jul. 30, 2007

(65) Prior Publication Data
US 2008/0026284 A1    Jan. 31, 2008

(30) Foreign Application Priority Data
Jul. 31, 2006    (JP) .................................. 2006-208176

(51) Int. Cl.
*H01M 10/50*    (2006.01)
(52) U.S. Cl. ........ 429/120; 429/148; 429/149; 429/151; 429/152
(58) Field of Classification Search .................. None
See application file for complete search history.

(56) References Cited

U.S. PATENT DOCUMENTS
2002/0051340 A1*   5/2002   Oda et al. ...................... 361/695
2008/0003495 A1*   1/2008   Shimizu ........................... 429/99

FOREIGN PATENT DOCUMENTS
| JP | 11-329518 | 11/1999 |
| JP | 2001-313090 | 11/2001 |
| JP | 2002-50412 | 2/2002 |

* cited by examiner

*Primary Examiner* — Ula C. Ruddock
*Assistant Examiner* — Tony Chuo
(74) *Attorney, Agent, or Firm* — Wenderoth, Lins & Ponack, L.L.P.

(57) ABSTRACT

An electric power source containing a plurality of batteries stacked in two or more tiers in a battery case, which is provided with an intermediary duct between a first sub holder case and a second sub holder case. A first outer duct is located outside the first sub holder case and a second outer duct is located outside the second sub holder case. The power source is so designed that cooling air is blown to the intermediary duct, the holder case and the outer duct, thus cooling the batteries in the holder case. Further, the power source has a partition disposed inside the intermediary duct, with a first intermediary sub duct being connected to the first sub holder case and a second intermediary duct being connected to the second sub holder case.

10 Claims, 12 Drawing Sheets

ELECTRIC POWER SOURCE PROVIDING A BATTERY CASE WITH AN INTERMEDIARY DUCT

BACKGROUND OF THE INVENTION

1. Field of the Invention

The present invention relates generally to an electric power source which contains a plurality of batteries in a battery case and pertains specifically to a power source which is used to supply power to a motor mainly for driving a vehicle.

2. Description of the Related Art

An electric motor vehicle, such as an electric car and a hybrid car, which is designed to travel optionally with an internal combustion engine or with an electric motor, uses an electric power source, having a multitude of batteries interconnected, as a power unit for supplying electric power to a drive motor.

An electric power source used for this kind of application is designed to provide a high output voltage so that a large amount of electricity may be supplied to a motor which requires a high power. In order to satisfy such a design need, a multitude of batteries, interconnected in series, are contained in a holder case. For example, a currently commercially available power source mounted to a hybrid car has hundreds of batteries interconnected in series to generate a high output voltage. Such power source is designed to have five or six pieces of batteries interconnected in series to form a battery module, and further a multitude of such battery modules are interconnected in series within a holder case.

In the electric power source mounted to an electric motor vehicle such as a hybrid car, when the vehicle needs a burst of speed, a large current is discharged to accelerate the motor, and when the vehicle is slowed down or when the vehicle travels down a slope, a large current is charged by means of a regenerative brake. Such a discharging and charging cycle may often cause the battery to be heated to a considerably high temperature. In addition, when the battery is used at higher temperatures, like in a summer season, the battery temperature tends to be elevated to even higher degrees. In view of these factors, when a power source contains a multitude of batteries in its holder case, it is vital to cool each of the contained batteries both effectively and uniformly. This is because various disadvantages are likely to occur when a temperature difference exists among the batteries being cooled. For example, a battery having undergone a high temperature tends to degrade, and thus results in a reduced amount of real charge capacity for reaching a full charge. When a battery with a reduced amount of real charge capacity is interconnected in series to be charged and discharged with the same current, the battery is very likely to be overcharged or over-discharged. This happens when a full charge capacity and a full discharge capacity have become smaller. A remarkable decrease is caused to a battery in its property or performance through an overcharge and over-discharge, so that a battery with a reduced, real amount of charge capacity is accelerated into degradation. Especially when the battery temperature is elevated to higher degrees, the battery is even more likely to be degraded. For these reasons, when an electric power source contains a multitude of batteries in a holder case, it is important to uniformly cool all the batteries so that a temperature irregularity may be prevented.

There have been developed a variety of battery structures to overcome such drawbacks resulting from the temperature irregularity. Refer to Japanese Laid-Open Patent Publication Nos. 2001-313090, 2002-50412 and 1999-329518.

SUMMARY OF THE INVENTION

The power sources, previously disclosed in Japanese Laid-Open Patent Publication Nos. 2001-313090 and 2002-50412, are both developed by the assignee of the present application. In these power sources, a plurality of cells are linearly interconnected with each other to form a battery module, and a plurality of such battery modules are positioned in a mutually parallel relationship within a holder case. Inside the holder case, the battery modules are cooled by forcibly blowing cooling air so as to intersect the axial direction of the battery modules. The battery modules are disposed in two tiers in the direction of blowing the cooling air. Further, the power source has a plurality of holder cases arranged and contained in an outer case. The power source is capable of adjusting an output voltage by varying the number of holder cases to be contained within the outer case. In addition, each individual holder case has an air-blowing space provided so as to face the battery modules contained within the holder case. The air-blowing space is provided for the purpose of allowing the cooling air to be blown to cool the battery modules. Also, in order to uniformly cool each individual battery module, there is a control member disposed between the battery modules, which are contained in the air-blowing direction, so that the member may control a flow of the cooling air.

The power source thus structured is capable of uniformly cooling battery modules contained in two tiers within a holder case. However, when battery modules are to be contained in three or more tiers within the holder case for reducing a total installation area, it becomes difficult or impossible to uniformly cool all of the battery modules.

Japanese Laid-Open Patent Publication No. 1999-329518, on the'other hand, describes a power source which contains battery modules in three or more tiers within a holder case. In that power source, a plurality of battery modules, positioned in a parallel relationship relative to one another and separated along the blowing direction of cooling air, are contained within the holder case in a multi-tier manner. This power source allows the battery modules to be cooled by forcibly blowing the cooling air in between the battery modules. Disadvantageously, however, such a cooling structure is prone to make a cooling performance less efficient for downstream battery modules than for upstream battery modules, thus generating a higher temperature. To overcome such a shortcoming, the holder case has an air turbulence accelerator, such as a dummy battery unit, provided in the uppermost stream so that a stream of cooling air coming into the holder case may be disturbed for allowing the battery module in the upstream to be effectively cooled. Further, the holder case has an auxiliary air intake, provided intermediate in a path of the cooling air, for allowing entry of the cooling air, and thus a cooling effectiveness is enhanced for a downstream battery.

In the above-described power source, a cooling effect for the downstream battery module can certainly be enhanced by means of the air turbulence or by the cooling air which is taken in intermediately. With such structure, however, it is impossible to cool all battery modules down to a uniform temperature.

The present invention has been made in order to solve such disadvantages. It is, therefore, a primary object of the present invention to provide an electric power source in which a plurality of, batteries, contained within a holder case in a multi-tier manner, are cooled effectively and uniformly with a reduced temperature difference among the batteries.

The inventive electric power source contains a plurality of batteries 1 stacked in two or more tiers in the battery case 3, 43, 53, 63, 73, 83. The battery case 3, 43, 53, 63, 73, 83 is divided into the first sub holder case 2A, 62A, 72A, 82A and the second sub holder case 3B, 62B, 73B, 82B, midway in the direction of stacking the batteries 1. Further, the battery case 3, 43, 53, 63, 73, 83 is provided an intermediary duct 4, 54, 64, 74, 84 for blowing cooling air, inside the holder case 2, 62, 72, 82 located between the divided first sub holder case 2A, 62A, 72A, 82A and second sub holder case 2B, 62B, 72B, 82B. Outside the first sub holder case 2A, 62A, 72A, 82A is provided a first outer duct 5A, 45A, 55A, 65A, 75A, 85A, and outside the second sub holder case 2B, 62B, 72B, 82B is provided a second outer duct 5B, 45B, 55B, 65B, 75B, 85B. The battery case 3, 43, 53, 63, 73, 83 has the divided first sub holder case 2A, 62A, 72A, 83A and second sub holder case 2B, 62B, 72B. 83B disposed between the first outer duct 5A, 45A, 55A, 65A, 75A, 85A and the second outer duct 5B, 45B. 55B. 75B, 75B, 85B. An intermediary duct 4, 54, 64, 74, 84 is disposed between the first sub holder case 2A, 62A, 72A, 82A and the second sub holder case 2B, 62B, 72B, 82B. The electric power source is so structured as to blow the cooling air to the intermediary duct 4, 54, 64, 74, 84, the holder case 2, 62, 72, 82, and the outer duct 5, 45,55, 64, 75, 85, so that the batteries 1 in the holder case 2, 62, 72, 82 may be cooled. Further, the electric power source has a partition 9, 59, 69, 79, 89 disposed inside the intermediary duct 4, 54, 64, 74, 84. The partition 9, 59, 69, 79, 89 serves to divide the intermediary duct 4, 54, 64, 74, 84 into the first intermediary sub duct 4A, 54A, 64A, 74A, 84A disposed on the side of the first sub holder case 2A, 62A, 72A, 82A, and the second intermediary sub duct 4B, 54B, 64B, 74B, 84B disposed on the side of the second sub holder case 2B, 62B, 72B, 82B. Thus, the cooling air is blown from the first intermediary sub duct 4A, 54A, 64A, 74A, 84A to the first sub holder case 2A, 62A, 72A, 82A, and thence through the second intermediary sub duct 4B, 54B, 64B, 74B, 84B to the second sub holder case 2B, 62B, 72B, 82B.

The inventive electric power source is so constructed and arranged that the cooling air flows from the intermediary duct 4, 54, 64 through the holder case 2, 62 to the outer duct 5, 45, 55, 65 for exhaustion, to thus cool the batteries contained in the holder case 2, 62. Alternatively, the power source is so constructed and arranged that the cooling air is blown from the first outer duct 75A, 85A to the first sub holder case 72A, 82A, or it is so designed that the cooling air is blown from the second outer duct 756, 85B through the second sub holder case 72B, 82B, so that the cooling air passing through the first sub holder case 72A, 82A and the second sub holder case 72B, 82B is exhausted through the intermediary duct 74, 84 after cooling the batteries 1. That is, the first sub holder case 72A, 82A exhausts the cooling air to the first intermediary sub duct 74A, 84A, while the second sub holder case 72B, 82B exhausts the cooling air to the second intermediary sub duct 74B, 84B.

The above-described power source carries the advantage that all batteries, being contained within a holder case in a multi-tier manner, can be cooled effectively and uniformly with a reduced temperature difference among the batteries. This is made possible because the power source is so constructed and arranged that: (1) a plurality of batteries are stacked in two or more tiers within a battery case; (2) the battery case is divided midway into first and second sub holder cases; (3) an intermediary duct is provided between the divided first and second sub holder cases; (4) an outer duct is respectively provided outside each of the first and second holder cases, so that cooling air is allowed to flow from the intermediary duct through the holder case into the outer duct or alternatively from the outer duct through the holder case into the intermediary duct, for cooling the batteries contained in the holder case; and further, (5) the intermediary duct, being provided with a partition inside the duct, is so divided into first and second intermediary sub ducts that the first intermediary sub duct is connected to the first sub holder case while the second intermediary sub duct is connected to the second sub holder case. In particular, since the power source thus structured divides the batteries, contained in the battery case in a multi-tier manner, into the first and second sub holder cases, the number of batteries to be contained in each tier in the first and second sub holder cases becomes about half. For example, in a power source where batteries are contained in total five tiers, the batteries can be contained in the first sub holder case in three tiers, and in the second sub holder case in two tiers. Generally, n a structure where batteries stacked in five tiers are to be cooled by sequentially blowing cooling air, the batteries in the windward is effectively cooled by the cooling air, whereas the batteries in the leeward are to be less effectively cooled down due to warmed-up air. In the case of the inventive power source, however, the 5-tiered batteries, being divided into three and two tiers, are forcibly blown by the cooling air, the batteries can be cooled uniformly in the windward and in the leeward, with a reduced temperature difference among the batteries. In particular, since the intermediate duct is provided between the segmented first and second sub holder cases to which the intermediary duct is respectively connected for blowing the cooling air through, the batteries contained in the first and second sub holder cases, being placed between the intermediary duct and the outer duct, can be uniformly cooled by forcibly blowing the cooling air.

Further, the above-described power source is featured in that because of a unique structure of providing a partition inside the intermediary duct, the batteries contained in the first and second sub holder cases in the equal number of tiers or in the unequal numbers of tiers can be cooled down to a uniform temperature. This is because the intermediary duct is divided by the partition into the first and second intermediary sub ducts, which are respectively connected to the first and second sub holder cases, so that the partition serves to forcibly blow an optimally controlled amount of air to the first and second sub holder cases.

By way of example, to cool the batteries uniformly, a power source containing batteries in total four tiers may have the batteries divided in the sub holder cases into two and two tiers respectively; a power source containing batteries in total five tiers may have the batteries divided in the sub holder cases into three and three tiers respectively; and a power source containing batteries in total seven tiers may have the batteries divided in the sub holder cases into four and three tiers respectively. In particular, by using the partition provided inside the intermediary duct, the inventive power source is featured in that an optimal amount of cooling air can be forcibly blown to correspond with the number of tiers in which to stack the batteries contained in each sub holder case, so that all the batteries can be cooled down to a more uniform temperature, with a reduced temperature difference among the batteries.

The inventive power source can be so constructed and arranged that the batteries 1 are contained in a larger number of tiers in the first sub holder case 2A, 72A than in the second sub holder case 2B, 72B, and that an inside width (d1) in the first intermediary sub duct 4A, 74A is made wider than an inside width (d2) in the second intermediary sub duct 4B, 74B.

The inventive power source can be so constructed and arranged that the batteries 1 are contained respectively in "m" number of tiers in the first sub holder case 2A, 72A and in "n" number of tiers in the second sub holder case 2B, 72B, with a ratio of the inside width (d1) in the first intermediary sub duct 4A, 74A to the inside width (d2) in the second intermediary sub duct 4B, 74B being m to n.

The present power source can be so constructed and arranged that each of the holder cases 2, 62, 72, 82 contains the batteries 1 in a plurality of tiers inside a pair of opposed walls 11, 21, 621, 711, 721, 821, and that the pair of opposed walls 11, 21, 621, 711, 721. 821 are closed, at an inlet side and exhaust side thereof, by an inlet wall 12, 22, 622, 712, 722, 822 and an exhaust wall 13, 23, 623, 713, 723, 823, to thus obtain a chamber 14, 24, 624, 714, 724, 824 defined by the pair of opposed walls it 21, 621, 711, 721, 821, the inlet wall 12, 22, 622, 712, 722, 822 and the exhaust wall 13, 23, 623, 713, 723, 823, so that the batteries 1 can be contained in the chamber 14, 24, 624, 714, 724. 824. The inlet wall 12, 22, 622, 712, 722, 822 has an inlet hole 15, 25, 625, 715, 725, 825, defined on both of lateral portions of the inlet wall 12, 22, 622, 712, 722, 822, for allowing the cooling air to flow inwardly, so that the cooling air coming through the inlet hole 15, 25, 625, 715, 725, 825 can be blown inwardly into a space defined by and between the battery 1 and the opposed wall 11, 21, 621, 711, 721, 821. The exhaust wall 13, 23, 623, 713, 723, 823, on the other hand, has an exhaust hole 16, 26, 626, 716, 726, 826, defined in the middle portion of the exhaust wall, for allowing the internal cooling air to flow outwardly, so that the cooling air flowing along a surface of the battery 1 can be blown outwardly through the middle portion of the exhaust wall. Further, the opposed wall 11, 21, 621, 711, 721, 821 is so designed as to have a ridge 17, 27, 627, 717, 727, 827 protruding inwardly toward and between two batteries 1 which are disposed adjacently to each other. A height of such inwardly protruding ridge 17, 717 can be made greater in the leeward than in the windward.

The inventive power source can be so constructed and arranged that, in the chamber 14, 714, the first sub holder case 2A contains a first battery 1A, a second battery 1B and a third battery 1C in three tiers along the air-blowing direction, and that the opposed wall 11, 711 has a first ridge 17A, 717A provided to face toward between the first battery 1A and the second battery 1B as well as having a second ridge 17B, 717B provided to face toward between the second battery 1B and the third battery 1C, with the second ridge 17B, 717B being made inwardly higher than the first ridge 17A, 717A.

The inventive power source can be so constructed and arranged that the opposed wall 11, 711 is curved, on both of lateral surfaces of the second ridge 17B, 717B, to matingly face a surface of the nearest battery 1.

The inventive power source can be so constructed and arranged that the inner surface is curved, in the vicinity of a boundary between the exhaust wall 13, 23, 623, 713, 723, 823 and the opposed wall 11, 21, 621, 711, 721, 821, to matingly face a surface of the nearest battery 1, so that an air flow space 18, 28, 628, 718, 728, 828 can be provided with respect to the battery 1.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
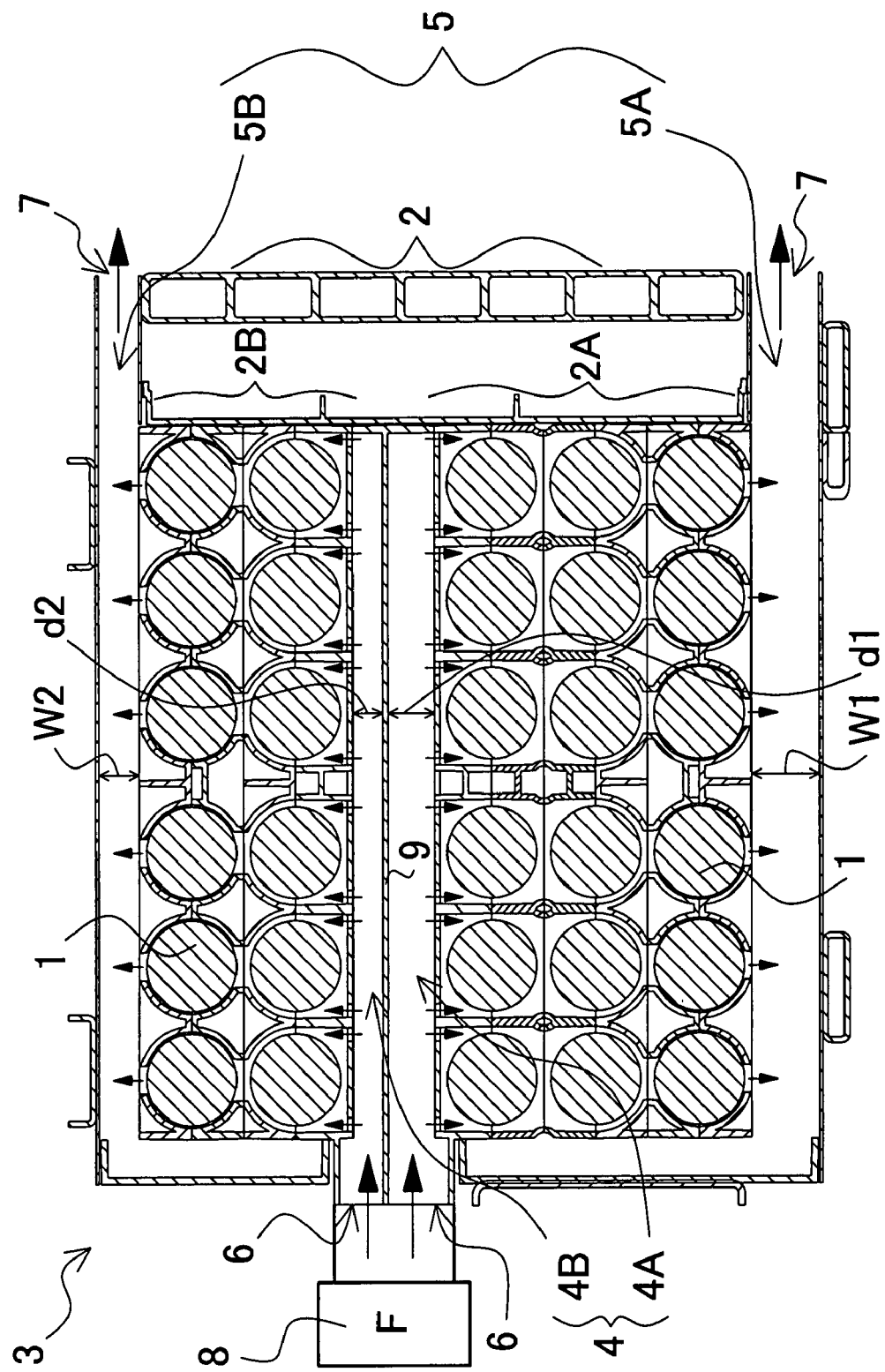
FIG. 1 is a cross sectional view of the electric power source in accordance with an embodiment of the present invention.
Figure 2:
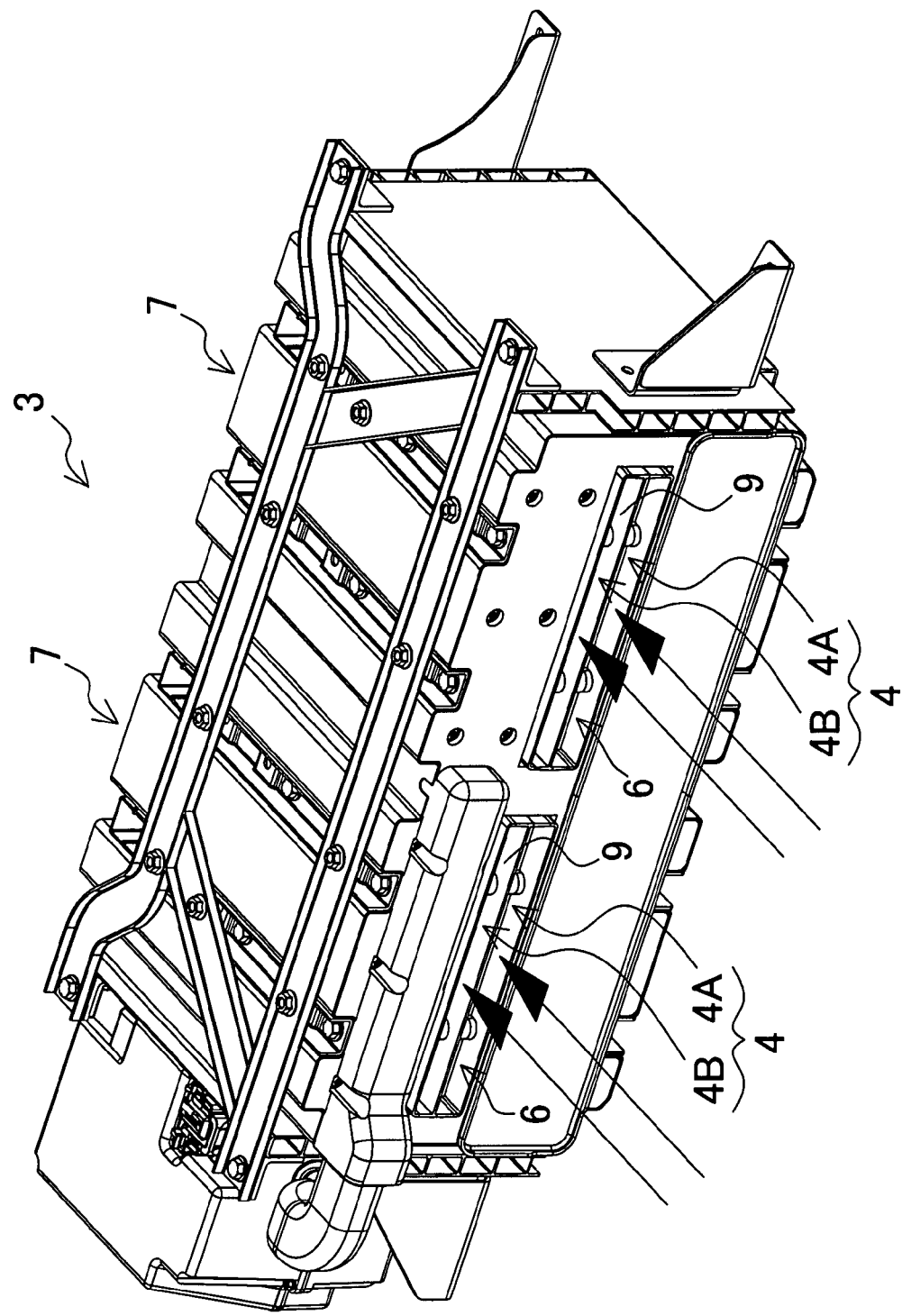
FIG. 2 is a perspective view of the electric power source in accordance with an embodiment of the present invention.

The electric power source for a motor vehicle, shown in the cross sectional view in FIG. 1 and in perspective view in FIG. 2, is designed to contain a plurality of batteries 1 stacked in five tiers within a battery case 3. While the illustrated power source contains the batteries 1 in five tiers, the inventive power source can also contain batteries in four or less tiers or in six or more tiers. The battery case 3 is divided into a first sub holder case 2A and a second sub holder case 2B midway between upper and lower stages as viewed in FIG. 1. In the illustrated battery case 3, the first sub holder case 2A is disposed in the lower stage, while the second sub holder case 2B is disposed in the upper stage. Being thus divided, the first sub holder case 2A contains the batteries 1 in a greater number of tiers than does the second sub holder case 2B. In the illustrated battery case 3, the batteries 1 are contained in three tiers within the first sub holder case 2A, and in two tiers within the second sub holder case 2B. In such a configuration, the first sub holder case 2A in the lower stage contains the batteries 1 in the larger number of tiers than does the second sub holder case 2B in the upper stage, the electric power source carries the advantage of being supported stably by shifting its center of gravity downwardly. Further, the first sub holder case 2A and the second sub holder case 2B contain the batteries 1 laterally in six columns. The holder case 2 contains all the batteries 1 in a parallel relationship with respect to one another, both in a multi-tier manner and in a multi-column manner. It should be noted, however, that the holder case is also able to contain the batteries in seven or more columns or in five or less columns.

The battery case 3 is provided with an intermediary duct 4 inside the holder case 2, midway between the divided first sub holder case 2A and second sub holder case 2B, for conducting cooling air therethrough. Further, a first outer duct 5A is provided below or outside the first sub holder case 2A, while a second outer duct 5B is provided above or outside the second sub holder case 2B. To describe the above configuration In other words, the battery case 3 is so constructed that the divided first sub holder case 2A and second sub holder case 2B are disposed between the first outer duct 5A and second outer duct 5B, while the intermediary duct 4 is disposed between the first sub holder case 2A and second sub holder case 2B. In the holder case 2, a supply port 6 and an exhaust port 7 are opened for the cooling air to flow through, each of which is connected respectively to the intermediary duct 4 and the outer duct 5, so that the cooling air may be blown into the intermediary duct 4 and the outer duct 5.

The power source shown in FIG. 1 is designed to cool the batteries 1 contained in the holder case 2 by allowing the cooling air to flow from the intermediary duct 4 through the holder case 2 into the outer duct 5 to thus be exhausted. This power source has the battery case 3 in which the supply port 6 is connected to the intermediary duct 4 and the exhaust port 7 is connected to the outer duct 5. In the illustrated power source, the cooling air forcibly blown from a cooling fan 8 is supplied into the intermediary duct 4, and is passed from the intermediary duct 4 to the holder case 2. Then the cooling air is exhausted from the outer duct 5 through the exhaust port 7. Alternatively, however, as will be described below in detail, the inventive power source may be so constructed and arranged that the batteries contained in the holder case are cooled by allowing the cooling air to flow from the outer duct through the holder case into the intermediary duct to thus be exhausted.

In order to uniformly cool the batteries 1 contained both in the first sub holder case 2A and the second sub holder case 2B, with a reduced temperature difference, the power source shown in FIG. 1 has the interior of the intermediary duct 4 segmented by a partition 9 into upper and lower portions. The illustrated intermediary duct 4 is provided with the partition 9 midway between the upper and lower portions to have the interior segmented into the first intermediary sub duct 4A and the second intermediary sub duct 4B. The illustrated intermediary duct 4 has the lower portion below the partition 9, as the first intermediary sub duct 4A, linked to the first sub holder case 2A, as well as having the upper portion above the partition 9, as a second intermediary duct 4B, linked to the second sub holder case 2B. The first intermediary sub duct 4A serves to blow the air into the first sub holder case 2A, while the second intermediary sub duct 4B serves to blow the air into the second sub holder case 2B.

The first intermediary sub duct 4A is made wider in the inside width than the second intermediary sub duct 4B. In the power source shown in FIG. 1, an inside width (d1) in the first intermediary sub duct 4A is made wider than an inside width (d2) in the second intermediary sub duct 4B. In particular, the power source shown in FIG. 1 is featured in that the batteries 1 are contained in three tiers within the first sub holder case 2A and in two tiers within the second sub holder case 2B, and that the ratio of the inside width (d1) of the first intermediary sub duct 4A to the inside width (d2) of the second intermediary sub duct 4B is 3 to 2. The power source is so designed that the inside width (d1) of the first intermediary sub duct 4A is made wider than the inside width (d2) of the second intermediary sub duct 4B to allow a greater amount of cooling air to be circulated, and thus the batteries 1 contained in the three tiers can be effectively cooled by the cooling air, with a reduced temperature difference among all the batteries 1.

Further, the power source can also be so constructed and arranged that the batteries are contained in the first sub holder case in "m" number of tiers and in the second sub holder case in "n" number of tiers, so that the inside width (d1) of the first intermediary duct to the inside width (d2) of the second intermediary duct is in the ratio of m to n. It should be noted, however, that the ratio of m to n regarding the inside width (d1) of the first intermediary duct to the inside width (d2) of the second intermediary duct can be expressed in a single significant digit by rounding off to be integer of m and n. For example, as shown in FIG. 1, in the power source where the batteries 1 are contained in the first sub holder case 2A in three tiers and in the second sub holder case 2B in two tiers, the ratio of the inside width (d1) in the first sub holder case 2A to the inside width (d2) in the second sub holder case 2B is set at 3 to 2, but it should be understood that the numeral "3" may include a value obtained by rounding off to be an integer of 3, namely a value ranging from 2.6 to 3.4, while the numeral "2" may include a value obtained by rounding off to be an integer of 2, namely a value ranging from 1.6 to 2.4. In this power source, the batteries 1 are contained in a multi-tier manner in the first sub holder case 2A and the second sub holder case 2B, and the number of tiers for containing the batteries 1 can be equal or unequal in the two sub holder cases, and yet the batteries 1 contained in a multi-tier manner in the first sub holder case 2A and the batteries contained in a multi-tier manner in the second sub holder case 2B can be uniformly cooled by the cooling air.

Further, in the power source shown in FIG. 1, an inside width (W2) of the second outer duct 5B is made narrower than an inside width (W1) of the first outer duct 5A. In particular, in the power source shown in FIG. 1, the batteries 1 are contained in three tiers within the first sub holder case 2A and in two tiers within the second sub holder case 2B, so that the inside width (W1) in the first outer duct 5A to the inside width (W2) in the second outer duct 5B is in the ratio of 3 to 2. The power source is so designed that the inside width (W2) in the second outer duct 5B is narrower to allow a smaller amount of cooling air to be circulated, while the inside width (W1) in the first outer duct 5A is wider to allow a greater amount of cooling air to be circulated, so that the batteries 1 contained in three tiers can be effectively cooled by the cooling air, with a reduced temperature difference among all the batteries 1. The power source serves to uniformly cool the batteries 1 both in the first sub holder case 2A and in the second sub holder case 2B, with a reduced temperature difference among all of the batteries.

Further, although not illustrated, the power source may also be so constructed and arranged that the batteries 1 are contained respectively in "m" number of tiers within the first sub holder case and in "n" number of tiers within the second sub holder case, so that the inside width (W1) in the first outer duct to the inside width (W2) in the second outer duct is in the ratio of m to n. As described above, the power source, where both of the inside widths in the intermediary duct 4 and the outer duct 5 are set to be in the ratio of the number of tiers of the batteries 1 contained in the first sub holder case 2A and the second sub holder case 2B, is featured in that the batteries can be cooled uniformly, with a further reduced temperature difference among the batteries 1 contained in the first sub holder case 2A and the second sub holder case 2B.

Figure 3:
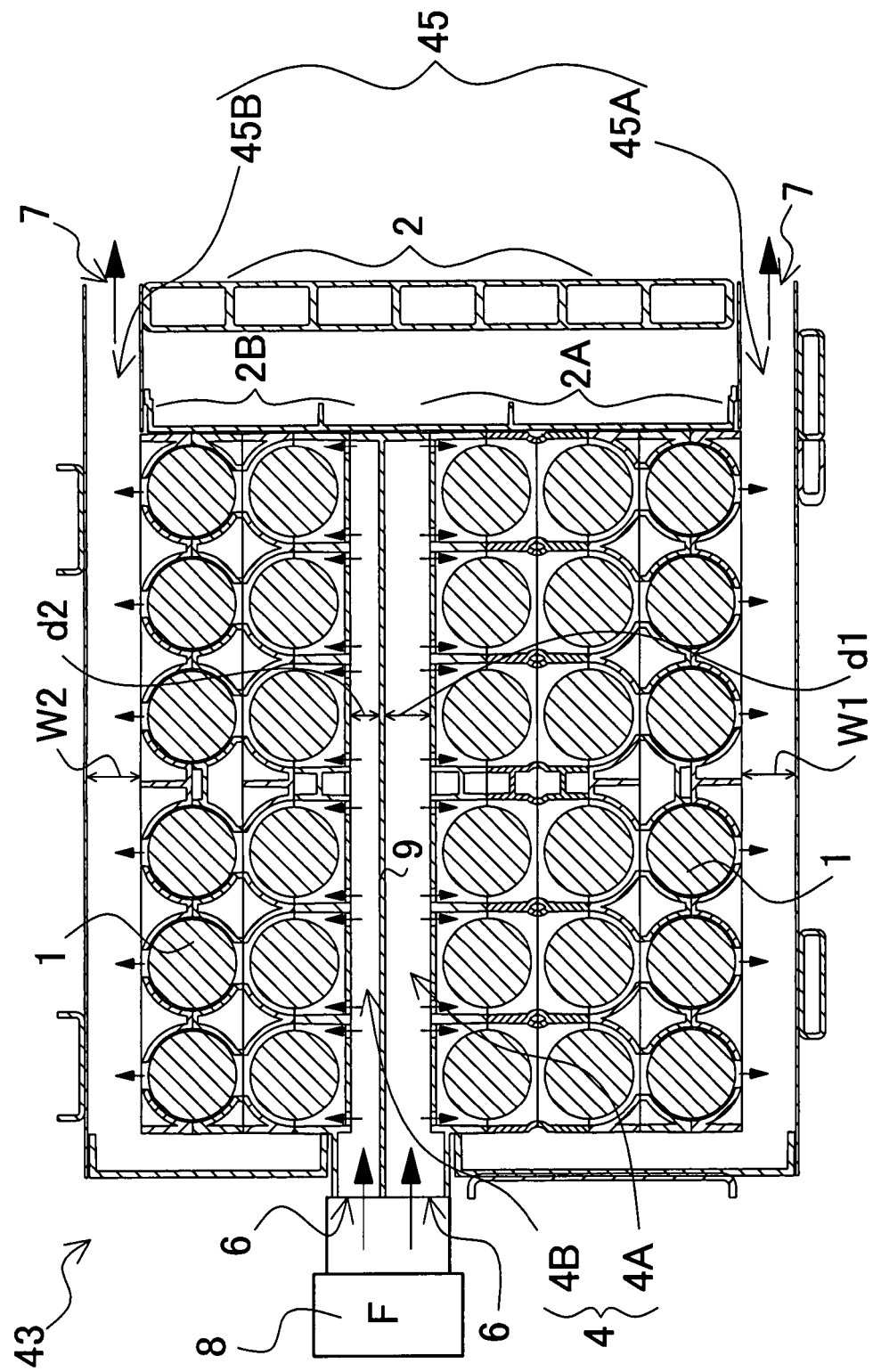
FIG. 3 is a cross sectional view of the electric power source in accordance with an alternative embodiment of the present invention.

However, as shown in FIG. 3, the power source can also be so constructed and arranged that an inside width (W1) in a first outer duct 45A and an inside width (W2) in a second outer duct 45B is made equal, that is, in the ratio of W1:W2=1:1. In this power source as well, when an inside width (d1) in a first intermediary sub duct 4A segmented by a partition 9 is made wider than the inside width (d2) in a second intermediary sub duct 4B to increase the amount of cooling air to be circulated, the batteries 1 in three tiers can be effectively cooled to obtain a uniform cooling effect both in the first sub holder case 2A and the second sub holder case 2B. In FIG. 3, a battery case is designated by 43, and an outer duct is designated by 45.

Figure 4:
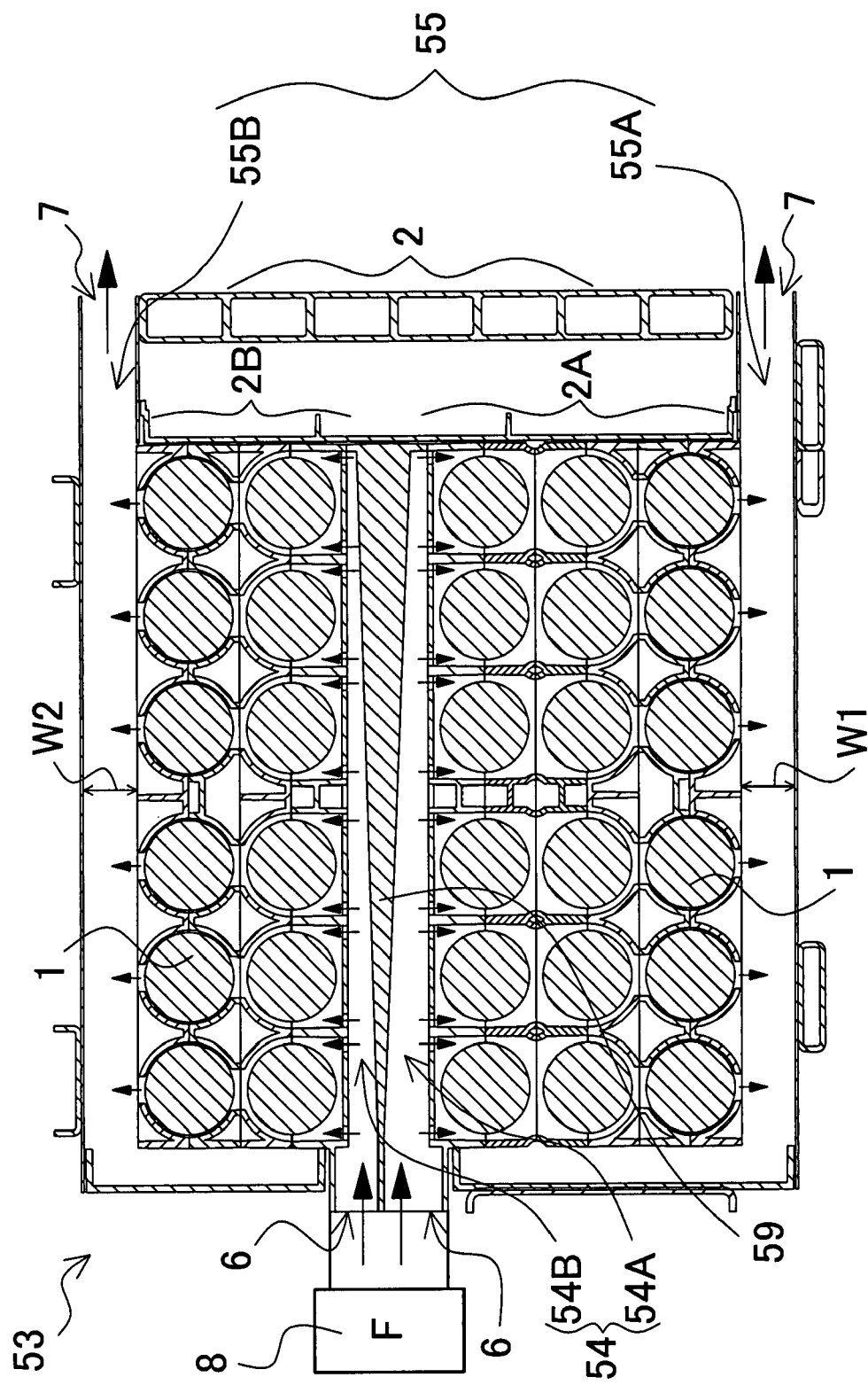
FIG. 4 is a cross sectional view of the electric power source in accordance with another embodiment of the present invention.

Further, in the power source shown in FIG. 4, a battery case 53 has the inside widths of a first intermediary sub duct 54A and a second intermediary sub duct 54B narrowed along and toward the blowing direction of the cooling air. The power source has a partition 59 made gradually thicker toward the depth, so that the inside widths in an intermediary duct 54 are tapered off toward the depth. In the power source, the thickness of the partition 59 is made gradually thicker in such a shape that the ratio of the inside width in the first intermediary sub duct 54A to the inside width in the second intermediary sub duct 54B will remain unchanged in every portion. The power source allows the cooling air to be blown uniformly to the deeper portion of the intermediary duct 54, so that the batteries 1 can be cooled more uniformly. It should be noted, however, that the power source can also be so constructed and arranged that two pieces of partitions are disposed slantingly inside the intermediary duct, so that the insider widths in the first and second intermediary sub ducts taper off toward the depth. Further, an outer duct 55 of the power source is so designed that an inside width (W1) in a first outer duct 55A and an inside width (W2) in a second outer duct 55B are equal, that is, in the ratio of W1:W2=1:1. Yet, the power source can also be so constructed and arranged that the inside width (W2) in the second outer duct is made narrower than the inside width (W1) in the first outer duct.

Figure 5:
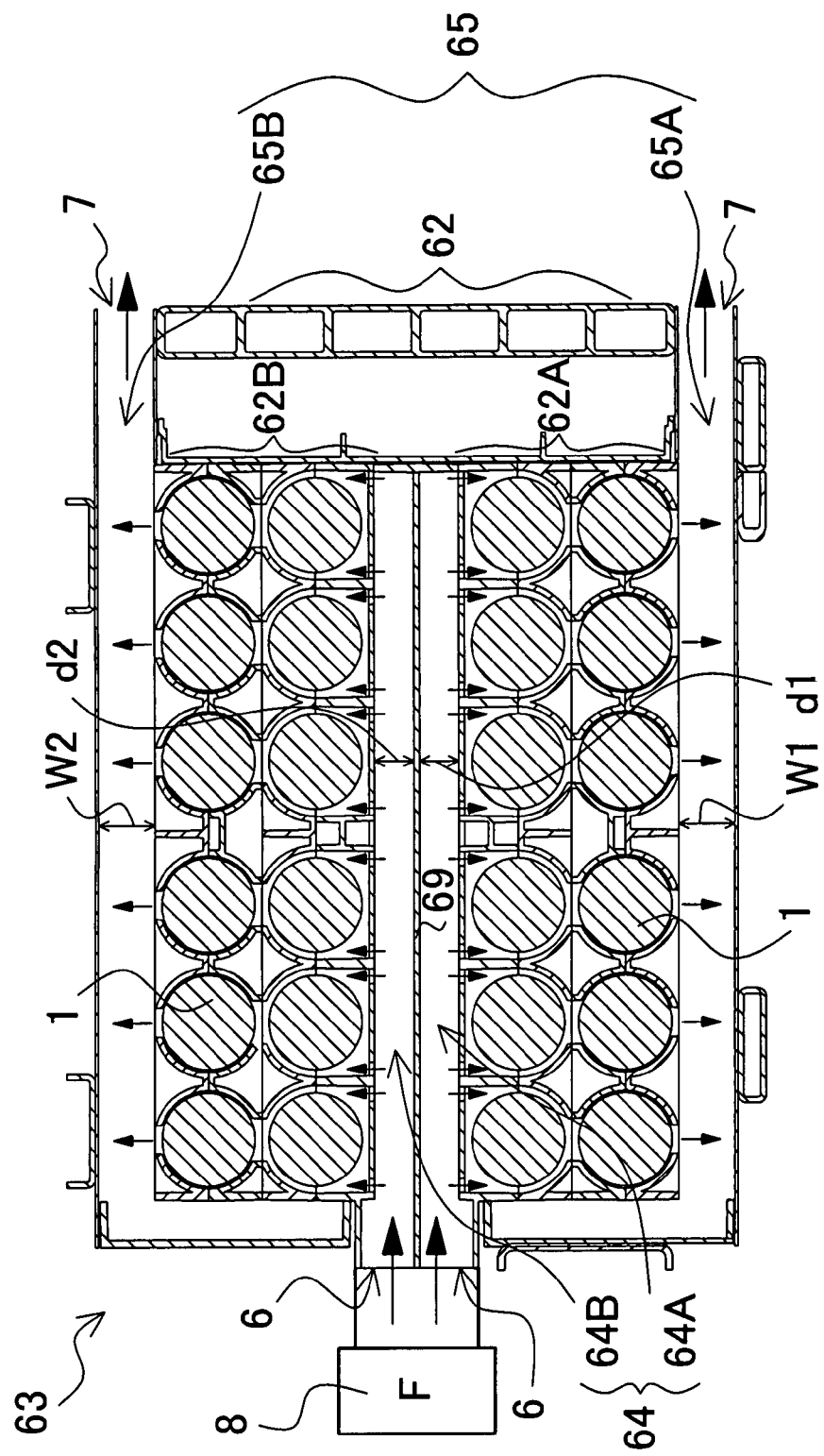
FIG. 5 is a cross sectional view of the electric power source in accordance with yet another embodiment of the present invention.

Further, in the power source shown in FIG. 5, a battery case 63 contains the batteries 1 in the same number of tiers both in a first sub holder case 62A and a second sub holder case 62B, that is, in two tiers, so that an inside width (d1) in a first intermediary sub duct 64A and an inside width (d2) in a second intermediary sub duct 64B are equal, that is, in the ratio of d1:d2=1:1. This power source allows the cooling air to be blown in equal amounts to the first intermediary sub duct 64A and the second intermediary sub duct 64B which are segmented by a partition 69, so that the batteries 1 can be cooled uniformly in the first sub holder case 62A and the second sub holder case 62B. Further, an outer duct 65 of the power source is so designed that an inside width (W1) in a first outer duct 65A and an inside width (W2) in a second outer duct 65B are equal, that is, in the ratio of W1:W2=1:1.

Figure 6:
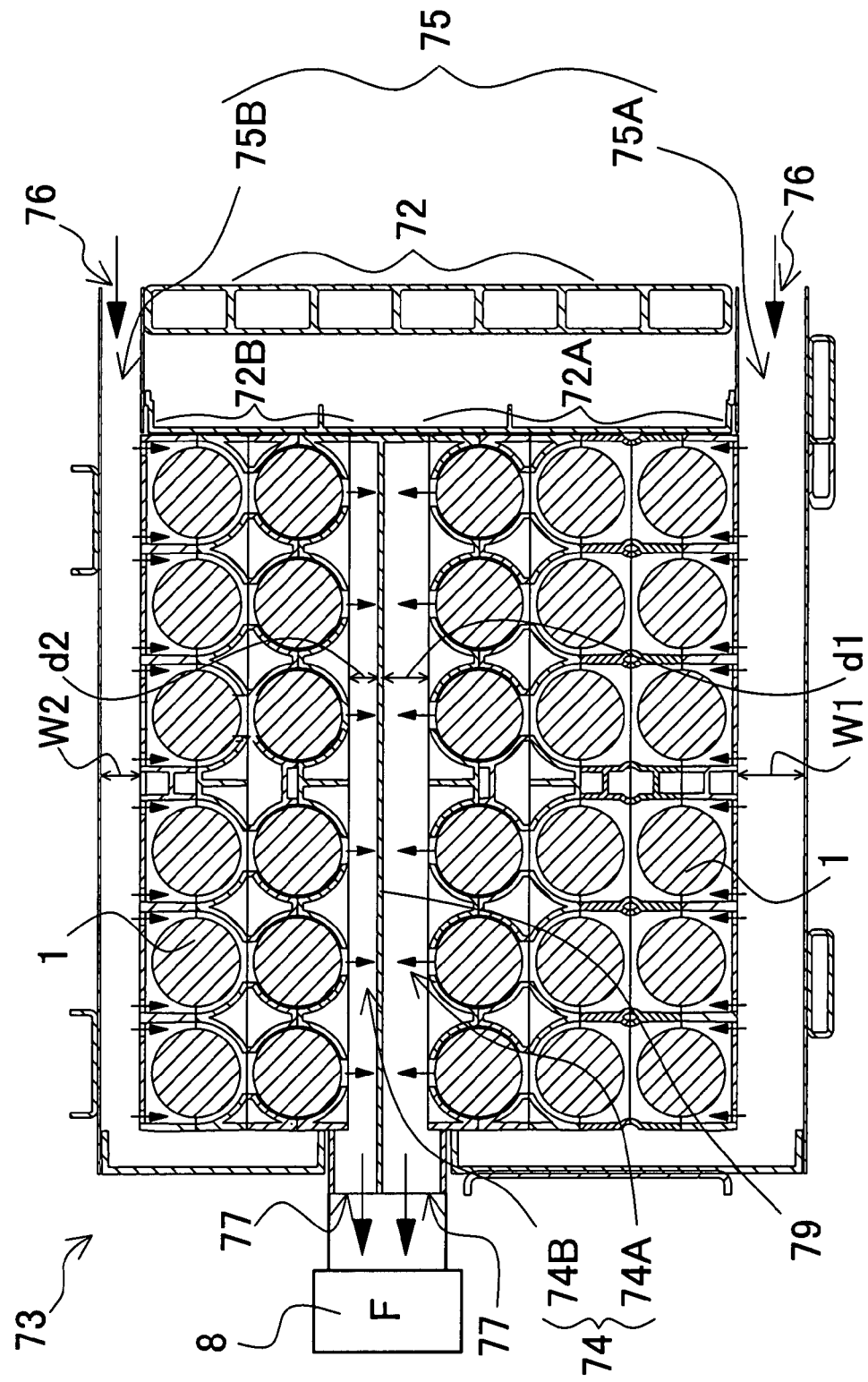
FIG. 6 is a cross sectional view of the electric power source in accordance with even another embodiment of the present invention.
Figure 7:
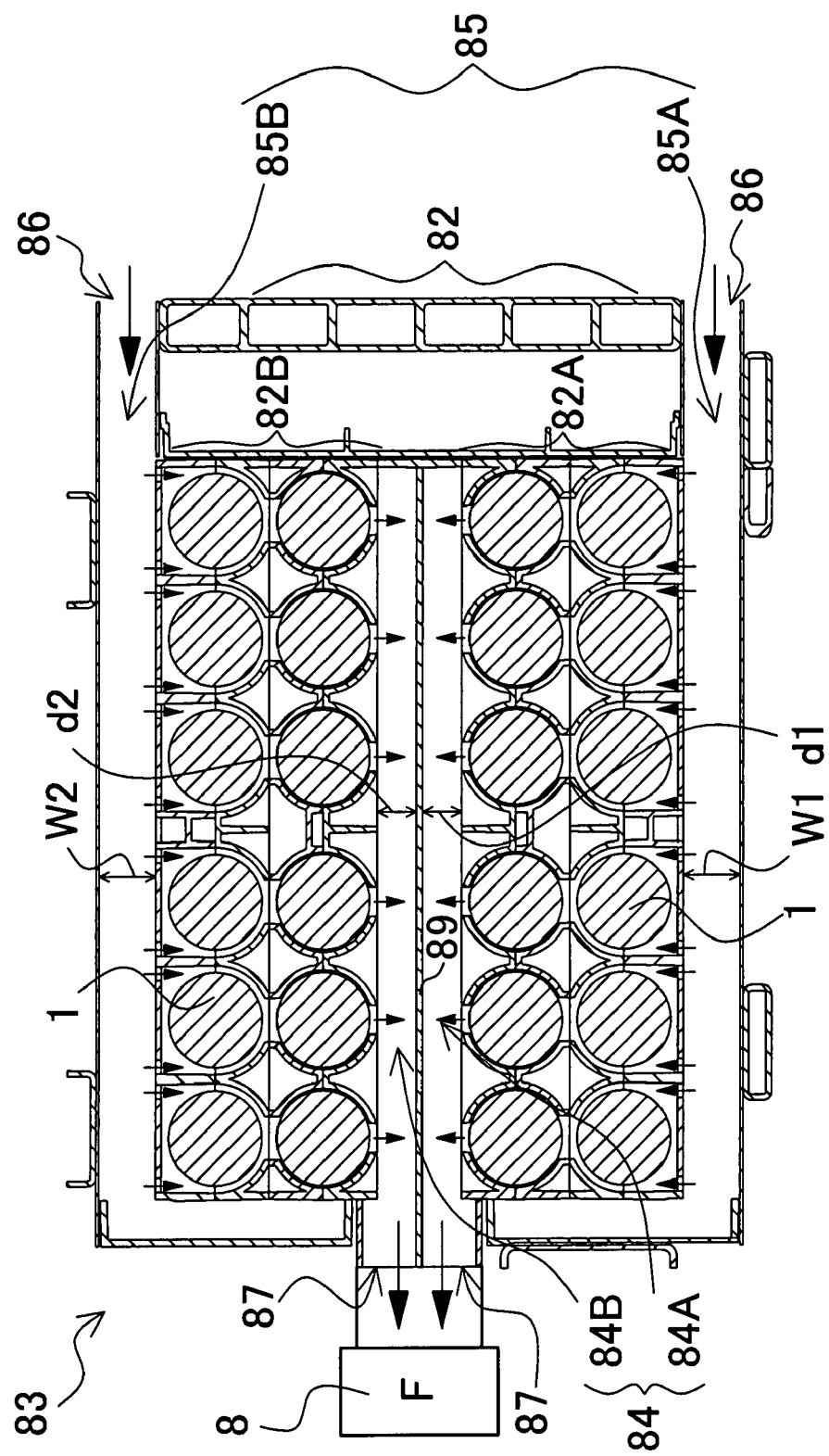
FIG. 7 is a cross sectional view of the electric power source in accordance with a further embodiment of the present invention.

Further, the power source for a motor vehicle shown in FIGS. 6 and 7 is so structured as to cool the batteries 1 contained in a holder case 72, 82 by allowing the cooling air to flow from an outer duct 75, 85 through the holder case 72, 82 into an intermediary duct 74, 84 for exhaustion. This power source has a supply port 76, 86 connected to the outer duct 75, 85, and an exhaust port 77, 87 connected to the intermediary duct 74, 84, within a battery case 73, 83. Further, the illustrated power source has a cooling fan 8, connected to the exhaust port 77, 87 in the holder case 72, 82, for forcibly blowing cooling air. The illustrated cooling fan 8 is so structured as to suck the air from the exhaust port 77, 87 and to forcibly draw the cooling air into the battery case 73, 83. It should be noted that the cooling fan can also be so designed as to forcibly blow the cooling air from the supply port. In the power source shown in these figures, the cooling air forcibly blown by the cooling fan 8 is supplied from the supply port 76, 86 to the outer duct 75, 85, passed from the outer duct 75, 85 through the holder case 72, 82, and then passed through the intermediary duct 74, 84 for exhaustion through the exhaust port 77, 87.

In the battery case 73, 83, a segmented first sub holder case 72A, 82A and second sub holder case 72B, 82B are disposed between a first outer duct 75A, 85A and a second outer duct 75B, 85B, and further, the intermediary duct 74, 84 is disposed between the first sub holder case 72A, 82A and the second sub holder case 72B, 82B. In the holder case 72, 82, the interior of the intermediary duct 74, 84 is divided by a partition 79, 89 into upper and lower portions, so that the batteries 1 can be cooled uniformly in the first sub holder case 72A, 82A and the second sub holder case 72B, 82B, with a reduced temperature difference among the batteries. In the illustrated intermediary duct 74, 84, the portion below the partition 79, 89 is a first intermediary sub duct 74A, 84A connected to the first sub holder case 72A, 82A, while the portion above the partition 79, 89 is a second intermediary sub duct 74B, 84B connected to the second sub holder case 72B, 82B. In the power source thus structured, the cooling air coming from the lower supply port 76, 86 is allowed to flow from the first outer duct 75A, 85A through the first sub holder case 72A, 82A into the first intermediary sub duct 74A, 84A to be exhausted through the exhaust port 77, 87. The cooling air coming from the upper supply port 76, 86, on the other hand, is allowed to flow from the second outer duct 75B, 85B through the second sub holder case 72B, 82B into the second intermediary sub duct 74B, 84B to be exhausted through the exhaust port 77, 87.

In the power source shown in FIG. 6, the batteries 1 are contained in the first sub holder case 72A in three tiers, and in the second sub holder case 72B in two tiers. As such, the power source is so designed that an inside width (d1) in the first intermediary sub duct 74A is made wider than an inside width (d2) in the second intermediary sub duct 74B. In particular, the power source shown in FIG. 6 is so constructed and arranged that the batteries are contained in the first sub holder case 72A in three tiers, and in the second sub holder case 72B in two tiers, and that the inside width (d1) in the first intermediary sub duct 74A to the inside width (d2) in the second intermediary sub duct 74B is in the ratio of 3 to 2. In this power source, the inside width (d1) in the first intermediary sub duct 74A is made larger than the inside width (d2) in the second intermediary sub duct 74B, so that the batteries 1 contained in three tiers are effectively cooled by the cooling air, with a reduced temperature difference among all the batteries 1.

Further, in the power source shown in FIG. 7, the batteries 1 are contained in the same number of tiers both in the first sub holder case 82A and in the second sub holder case 82B, that is, both in two tiers, so that the inside width (d1) in the first intermediary sub duct 84A and the inside width (d2) in the second intermediary sub duct 84B are equal, that is, in the ratio of d1:d2=1:1. This power source allows the cooling air to be passed in an equal amount from the first intermediary sub duct 84A and the second intermediary sub duct 84B which are segmented by the partition 89, so that the batteries 1 can be cooled uniformly in the first sub holder case 82A and the second sub holder case 82B.

The batteries are contained in the holder case 2 in battery modules in which a plurality of unit cells are linearly interconnected in series. For example, four pieces of unit cells are linearly interconnected in each battery module. However, the battery module may optionally have three or less pieces of unit cells or five or more pieces of interconnected unit cells. The unit cell is a nickel-hydrogen battery. However, the unit cell may be any other kind of secondary battery such as a lithium-ion cell and nickel-cadmium cell. The illustrated battery module is formed in a columnar state, with cylindrical unit cells being linearly interconnected.

The battery modules as the batteries 1, being contained in the holder case 2, are interconnected in series by using a bus-bar (not shown). The bus-bar is fixed to an end plate (not shown) in the holder case 2. The end plate is positioned in contact with opposed end surfaces in the battery module and is fixed to the holder case 2. The end plate, being formed with an insulator such as a plastic material, connects in a predetermined position the bus-bar which is fixed to electrode terminals provided on the opposed ends of the battery module. The bus-bar is a metallic plate which interconnects the adjoining battery modules in series. The end plate is fixed to the battery module by screwing the bus-bar and fixed to the holder case 2 in a predetermined position.

Figure 8:
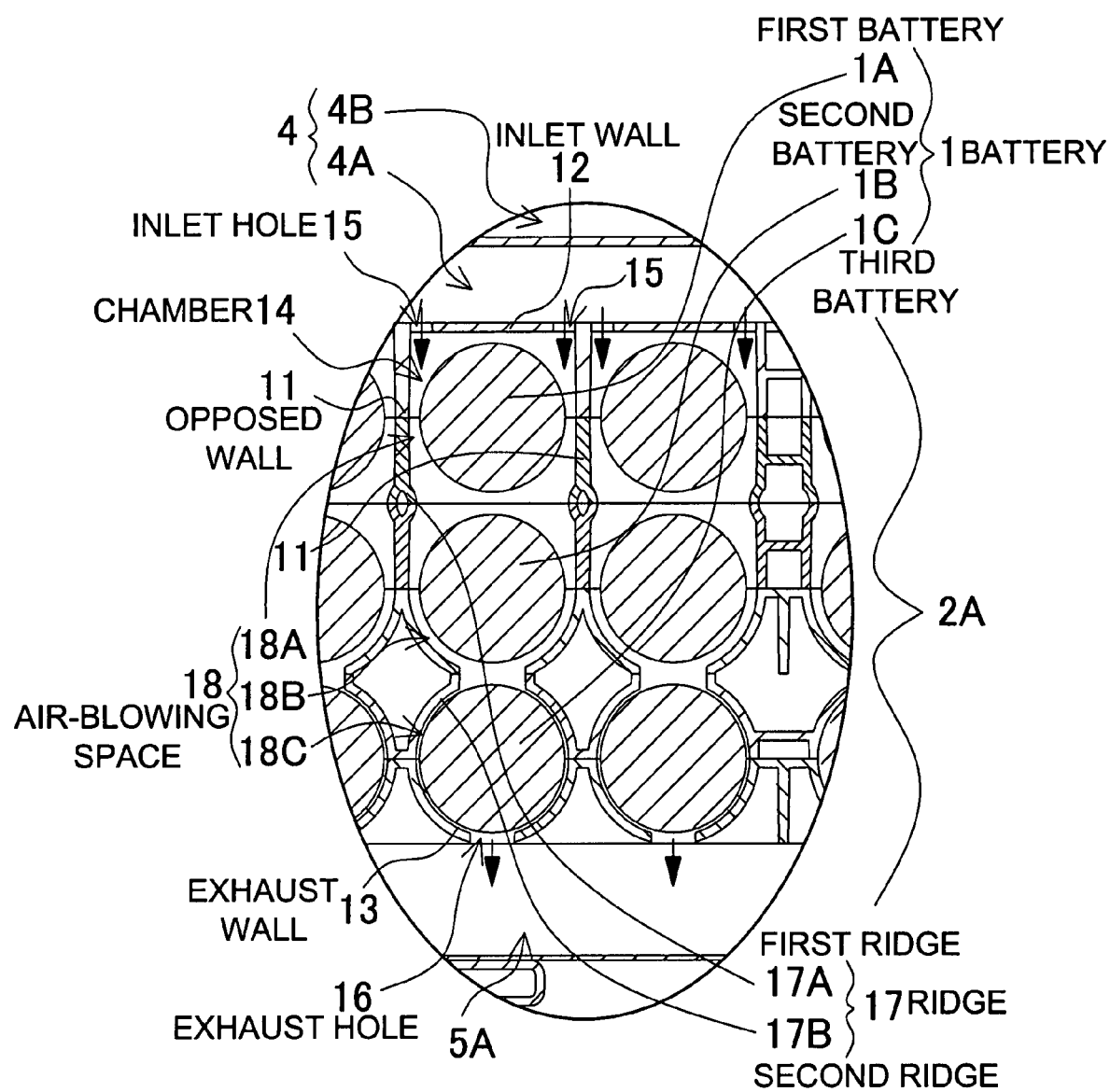
FIG. 8 is an enlarged, cross sectional view of the first sub holder case in the electric power source shown in FIG. 1.
Figure 9:
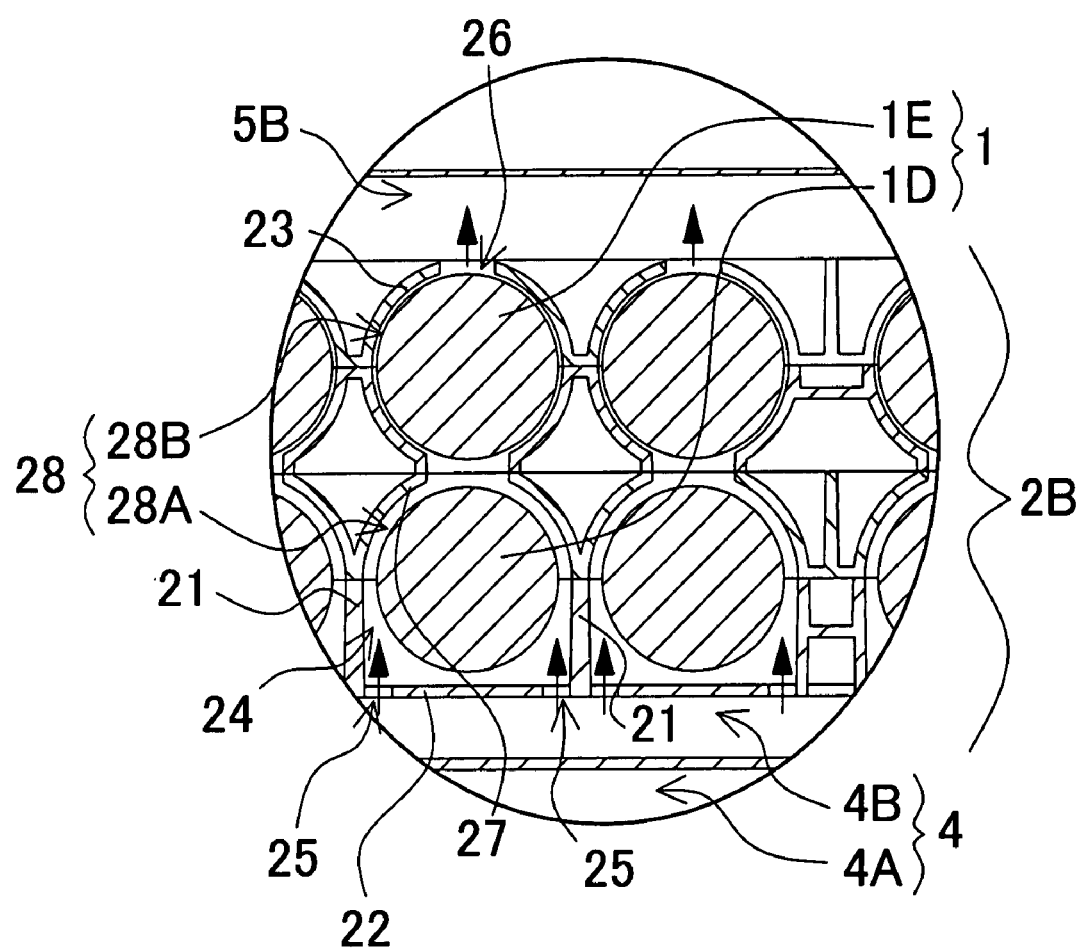
FIG. 9 is an enlarged, cross sectional view of the second sub holder case in the electric power source shown in FIG. 1.

The holder case according to the above-described embodiments contains the battery modules in a parallel relationship with respect to one another in a plurality of tiers in the blowing direction of the cooling air (in the vertical direction as viewed in the drawings). In the power source shown in FIGS. 1, 3, 4, and 6, respectively, the battery modules are contained in three tiers in the first sub holder case 2A, 72A and in two tiers in the second sub holder case 2B, 72B. To add an explanation, FIG. 8 and FIG. 9 are enlarged, cross sectional views showing the second sub holder case 2 in the power source as shown in FIGS. 1, 3 and 4, with FIG. 8 depicting the first sub holder case 2A and with FIG. 9 depicting the second sub holder case 2B. Further, FIG. 10 is an enlarged, cross sectional view of the holder case 2 in the power source shown in FIG. 6.

The first sub holder case 2A, 72A has its interior portion partitioned into a plurality of chambers 14, 714, and the second sub holder case 2B, 72B has its interior portion partitioned into a plurality of chambers 24, 724, so that the batteries 1 are contained in a plurality of tiers in the chamber 14, 24, 714, 724, respectively. The first sub holder case 2A, 72A and the second sub holder case 2B, 72B respectively contain the batteries 1 in a plurality of tiers inside a pair of opposed walls 11, 21, 711, 721; and the pair of opposed walls 11, 21, 711, 721 are closed, at the inlet side and the exhaust side, by an inlet wall 12, 22, 712, 722 and an exhaust wall 13, 23, 713, 723 to define the chamber 14, 24, 714, 724 by the pair of opposed walls 11, 21, 711, 721, the inlet wall 12, 22, 712, 722 and the exhaust wall 13, 23, 713, 723, so that the batteries 1 are contained in the chamber 14, 24, 714, 724.

Figure 10:
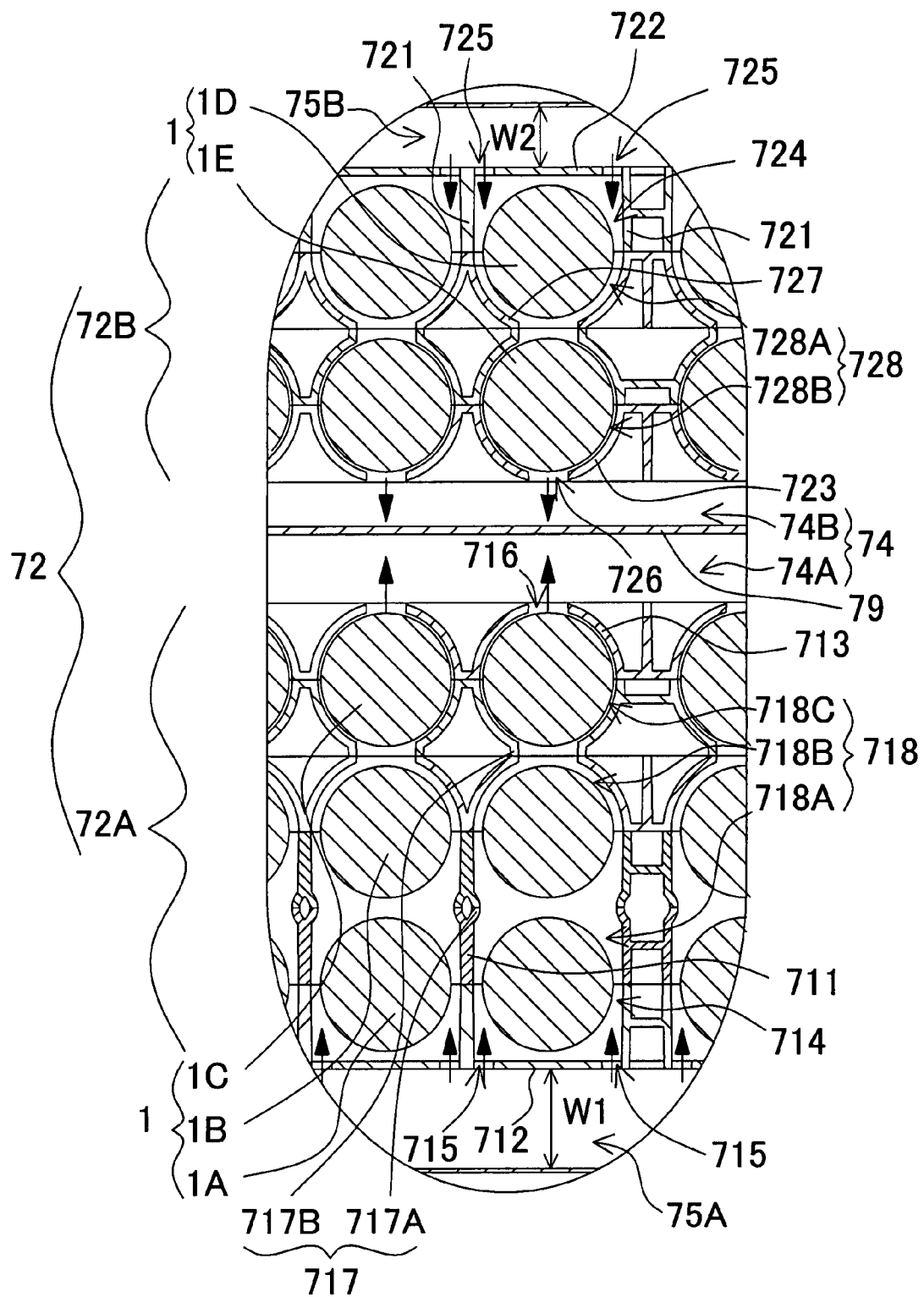
FIG. 10 is an enlarged, cross sectional view of the holder case in the electric power source shown in FIG. 6.

The first sub holder case 2A, 72A shown in FIGS. 8 and 10 contains the batteries 1 in three tiers per column between a pair of opposed walls 11, 711. The first sub holder case 2A, 72A contains a first battery 1A, a second battery 1B and a third battery 1C in three tiers along the air-blowing direction (from the top to the bottom as viewed in FIG. 8, and from the bottom to the top as viewed in FIG. 10). The second sub holder case 2B, 72B shown in FIGS. 9 and 10 contains the batteries 1 in two tiers per column between a pair of opposed walls 21, 721. The second sub holder case 2B, 72B contains a fourth battery 1D and a fifth battery 1E in two tiers along the air-blowing direction (from the bottom to the top as viewed in FIG. 9, and from the top to the bottom as viewed in FIG. 10). The first sub holder case 2A, 72A and the second sub holder case 2B, 72B respectively have an inlet hole 15, 25, 715, 725 and an exhaust hole 16, 26, 716, 726 opened for blowing the cooling air to the batteries 1 thus contained. The cooling air coming from the inlet hole 15, 25, 715, 725 to the holder case 2, 72 is exhausted through the exhaust hole 16, 26, 716, 726 after cooling the batteries 1.

The first sub holder case 2A, 72A and the second sub holder case 2B, 72B respectively have the inlet hole 15, 25, 715, 725 opened in the inlet wall 12, 22, 712, 722 as well as having the exhaust hole 16, 26, 716, 726 opened in the exhaust wall 13, 23, 713, 723. The inlet hole 15, 715 is opened at two lateral portions of the inlet wall 12, 712 and allows the cooling air coming inwardly through the hole to be blown into a space between the first battery 1A and the opposed wall 11, 711. The inlet wall 12 shown in FIG. 8 has the inlet hole 15 opened just above the inner surface of the opposed wall 11, while the inlet wall 712 shown in FIG. 10 has the inlet hole 715 opened just below the inner surface of the opposed wall 711. These inlet holes 15, 715 allow the cooling air to be blown along the inner surface of the opposed wall 11, 711, so that the cooling air passes through the space between the opposed wall 11, 711 and the first battery 1A. The inlet hole 25, 725 is opened at two lateral portions of the inlet wall 22, 722 and allows the cooling air coming inwardly through the hole to be blown into a space between the fourth battery 1D and the opposed wall 21, 721. The inlet wall 22 shown in FIG. 9 has the inlet hole 25 opened just below the inner surface of the opposed wall 21, while the inlet hole 722 shown in FIG. 10 has the inlet hole 25 just above the inner surface of the opposed wall 721. These inlet holes 25, 725 allow the cooling air to be blown along the inner surface of the opposed wall 21, 721, so that the cooling air passes through the space between the opposed wall 21, 721 and the fourth battery 1D.

Although the inlet hole 15, 25, 715, 725 is opened at two lateral portions of the inlet wall 12, 22, 712, 722, the location of the hole is not necessarily limited to the illustrated portion just above or below the inner surface of the opposed wall 11, 21, 711, 721. For example, the inlet hole may be opened in a portion shifted slightly toward the central portion away from the portion just above or below the inner surface of the opposed wall. However, when the inlet hole is to be opened in the central portion of the inlet wall, there arises a disadvantage that the cooling air will cool the first or fourth battery excessively as compared with other batteries. Although the first battery 1A and the fourth battery 1D experience a great amount of heat exchange at their lateral portions, namely in first air-blowing spaces 18A, 28A, 718A, 728A near the opposed walls 11, 21, 711, 721, but do not experience a great amount of heat exchange in other portions. The cooling air for cooling the first battery 1A or the fourth battery 1D has a lower temperature than does the cooling air for cooling other batteries, so that the battery is effectively cooled in a narrow air-blowing space.

If the inlet hole is supposed to be opened in the central portion of the inlet wall, the cooling air coming through the inlet hole will flow into the holder case will flow along the half or semicircular surface of the battery facing the inlet wall and cool the battery. A well-balanced, uniform cooling effect with respect to other batteries is achieved when the first and fourth batteries are cooled only in the air-blowing space existing laterally with respect to the opposed wall, without being cooled on the outer surface facing the inlet wall. For this purpose, the inlet hole 15, 25, 715, 725 is not opened in the central portion of the inlet wall 12, 22, 712, 722. Even if shifted slightly toward the central portion away from the portion just above or below the inner surface of the opposed wall 11, 21, 711, 721, the inlet hole 15, 25, 715, 725 should still be opened in a position outer than the middle point between the portion just above or below the surface of the opposed wall 11, 21, 711, 721 and the central portion of the inlet wall 12, 22, 712, 722.

Unlike the inlet hole 15, 25, 715, 725, the exhaust hole 16, 26, 716, 726 is opened along the middle portion of the exhaust wall 13, 23, 713, 723. This is because in the first sub holder case 2A shown in FIG. 8 the third battery 1C can be effectively cooled by allowing the cooling air coming out of the chamber 14 to be blown along the lower surface of the third battery 1C, and in the first sub holder case 72A shown in FIG. 10 the third battery 1C can be effectively cooled by allowing the cooling air coming out of the chamber 714 to be blown along the upper surface of the third battery 1C. This is also because in the second sub holder case 2B shown in FIG. 9, the fifth battery 1E can be effectively cooled by allowing the cooling air coming out of the chamber 24 to be blown along the upper surface of the fifth battery 1E, and in the second sub holder case 72B shown in FIG. 10 the fifth battery 1E can be effectively cooled by allowing the cooling air coming out of the chamber 724 to be blown along the lower surface of the fifth battery 1E. In FIG. 8, the exhaust hole 16 opened in the center portion of the exhaust wall 13 allows the cooling air separated into the two lateral sides of the battery to be blown along the lower surface of the third battery 1C, and the air is collected at the center portion of the exhaust wall 13 to be exhausted. In FIG. 10, the exhaust hole 716 opened in the center portion of the exhaust wall 713 allows the cooling air separated into the lateral sides of the battery 1 to blown along the upper half surface of the third battery 1C, and the air is collected at the center portion of the exhaust wall 713 to be exhausted. Further in FIG. 9, the exhaust hole 26 opened in the center portion of the exhaust wall 23 allows the cooling air, which is separated into the lateral sides of the battery 1, to be blown along the upper half surface of the fifth battery 1E, and the air is collected at the center portion of the exhaust wall 23 to be exhausted. Also, in FIG. 10, the exhaust hole 726 opened in the center portion of the exhaust wall 723 allows the cooling air separated into the lateral sides of the battery 1 to be blown along the lower surface of the fifth battery 1E, and the air is collected at the center portion of the exhaust wall 723 to be exhausted. In the illustrated holder case 2, 72, the inner surface in the vicinity of the boundary between the exhaust wall 13, 23, 713, 723 and the opposed wall 11, 21, 711, 721 is curved so as to matingly face the surface of the battery 1. In the holder case 2, 72 thus configured with the inner surface in the exhaust side to matingly face the surface of the battery 1, the cooling air can be blown along the surface of the battery 1 and collected at the exhaust hole 16, 26, 716, 726 for outward exhaustion. As such, when the battery on the exhaustion side is effectively cooled and a reduced amount of heat exchange being caused by a temperature increase of the cooling air is corrected, a temperature difference can be reduced among the batteries 1.

Further, the holder case 2, 72 shown in FIGS. 8 through 10 is provided with a ridge 17, 27, 717, 727 which is protruded from the interior surface of the opposed wall 11, 21, 711, 721 so that an air-blowing state is controlled in the air-blowing space 18, 28, 718, 728 between the battery 1 in each tier and the opposed wall 11, 21, 711, 721. The ridge 17, 27, 717, 727 is provided so as to protrude toward and between two batteries 1 that are disposed adjacently.

The amount of heat exchange to be involved in cooling the battery module by the cooling air varies in accordance with a temperature difference between the cooling air and the battery module, a velocity of the cooling air, and the size of contact area with respect to the cooling air to be blown. The amount of heat exchange decreases when the temperature difference decreases between the cooling air and the battery module as the cooling air temperature rises. The temperature of the cooling air increases by the effect of absorbing the heat of the battery module. Therefore, the battery module in the leeward experiences a reduced amount of heat exchange due to the temperature increase of the cooling air.

It is possible to enhance the amount of heat exchange by enlarging the size of the contact area with respect to the cooling air to be blown or by speeding up the velocity of the cooling air. The protrusion height of the ridge 17, 27, 717, 727 defines the velocity of the cooling air to be blown on the surface of the batteries 1 and the size of the contact area. If the height of the protrusion height of the ridge gets higher, then the ridge tends to be closer to the surface of the batteries, and thus the air-blowing space formed between the battery and the ridge will be narrower. Also, the ridge having a higher protrusion height obtains a larger size air-blowing space formed between the battery and the ridge. By employing such, the reduction of heat exchange caused by the temperature drop, i.e., the temperature of the cooling air becomes gradually higher as it goes, can be corrected with the ridge 17, 27, 717, 727, and thus the entire batteries 1 are cooled uniformly.

In the first sub holder case 2A, 72A, shown in FIGS. 8 and 10, the inward protrusion height of the ridge 17, 717 is made higher in the leeward than in the windward, so that the region of an air-blowing space 18, 718 of the battery 1 in the leeward, namely, the size of contact area with respect to the battery 1 is increased, or the gap in the air-blowing space 18, 718 is decreased. The opposed wall 11, 717 in the first sub holder case 2A, 72A shown in FIGS. 8 and 10 is provided with a first ridge 17A, 717A between the first battery 1A and the second battery 1B, and is also provided with a second ridge 17B, 717B between the second battery 1B and the third battery 1C. The second ridge 17B, 717B, being higher than the first ridge 17A, 717A, is more adjacent to the surface of the battery 1 than is the first ridge 17A, 717A.

Further, in the opposed wall 11, 711 shown in FIGS. 8 and 10, both of the lateral surfaces in the second ridge 17B, 717B are so curved as to matingly face the surfaces of the nearest batteries 1. By provision of the uniform, air-blowing space 18, 718 with respect to the battery 1, the ridge 17, 717 enables the cooling air to be smoothly blown. Further, in the first sub holder case 2A, 72A shown in FIGS. 8 and 10, the inner surface in the vicinity of the boundary between the exhaust wall 13, 713 and the opposed wall 11, 711 is so curved as to matingly face the surface of the third battery 1C. Thus, in the first sub holder case 2A in which the inner surface on the exhaustion side faces matingly the surface of the third battery 1C, the cooling air can be blown along the surface of the battery 1 and collected at the exhaust hole 16, 716 for outward exhaustion. As such, when the third battery 1C is effectively cooled, the reduced amount of heat exchange caused by the temperature increase of the cooling air can be corrected to reduce the temperature difference among the batteries 1.

In the above-described holder case 2A, 72A, the first air-blowing space 18A, 718A is provided to correspond with the first battery 1A at the two lateral sides only, a second air-blowing space 18B, 818B is provided to correspond with the second battery 1B at the half portion in the leeward, and a third air-blowing space 18C, 718C is provided to correspond with the third battery 1C both in the windward and in the leeward. With this configuration, the size of area of the air-blowing space 18, 718, for the cooling air to be blown along the surface of the batteries 1, is increased from the first air-blowing space 18A, 718A toward the third air-blowing space 18C, 718C.

Further, in the first sub holder case 2A, 72A shown in FIG. 8, the velocity of the cooling air to be blown along the surface of the third battery 1C is made greater than the velocity of the cooling air to be blown along the surface of the second battery 1B, which is made possible by making the second ridge 17B, 717B higher than the first ridge 17A, 717A so that the gap in the third air-blowing space 18C, 718C becomes smaller than the gap in the second air-blowing space 18B, 718B with respect to the battery.

Although not illustrated, the first sub holder case 2A, 72A containing the batteries 1 in three tiers does not necessarily have to be provided with the first ridge as provided between the first battery and the second battery, because the second battery can be cooled at the leeward half portion by providing the air-blowing space defined by the second ridge. In regard to the second air-blowing space to be provided here, either of the following configurations facilitates uniform cooling of the first battery module, the second battery module and the third battery module.

In the opposed wall 21, 721 shown in FIGS. 9 and 10, both of the lateral surfaces of the ridge 27, 727 are so curved as to matingly face the surface of the nearest battery 1. The ridge 27, 727 enables the cooling air to be blown smoothly by providing a uniform, air-blowing space 28, 728 with respect to the battery 1. In the illustrated second sub holder case 2B, 72B, the first air-blowing space 28A, 728A is provided to correspond with the fourth battery 1D at the leeward half portion, and a second air-blowing space 28B, 728B is provided to correspond with the firth battery 1E both at the windward surface and at the leeward surface. With this configuration, the size of area of the air-blowing space 28, 728, for the cooling air to be blown along the surface of the batteries 1, is increased from the first air-blowing space 28A, 728A toward the second air-blowing space 28B, 728B.

The above-described holder case 2, 72 is structured with the first sub holder case 2A, 72A to contain the batteries 1 in three tiers and with the second sub holder case 2B, 72B to contain the batteries 1 in two tiers. However, the holder case may also be so structured that the first sub holder case contains the batteries in three or more tiers, and that the second sub holder case contains the batteries in the greater number of tiers than does the second sub holder case. Although not illustrated, these holder cases should be so structured as to uniformly cool the batteries contained in a multi-tier manner by adjusting the gap in the air-blowing space through altering the height or shape of a plurality of ridges provided in the opposed walls.

Further, as shown in FIGS. 5 and 7, in the holder case 62, 82 where battery modules are contained in the equal number of tiers in the first sub holder case 62A, 82A and the second sub holder case 62B, 82B, it is possible to prepare the first sub holder case 62A, 82A and the second sub holder case 62B, 82B in a vertically symmetrical configuration. The power source shown in FIGS. 5 and 7 contains batteries 1 in two tiers respectively in the first sub holder case 62A, 82A and the second sub holder case 62B, 82B. Here, FIG. 11 is an enlarged, cross sectional view of the holder case 62 in the power source shown in FIG. 5, while FIG. 12 is an enlarged, cross sectional view of the holder case 82 shown in FIG. 7.

Figure 11:
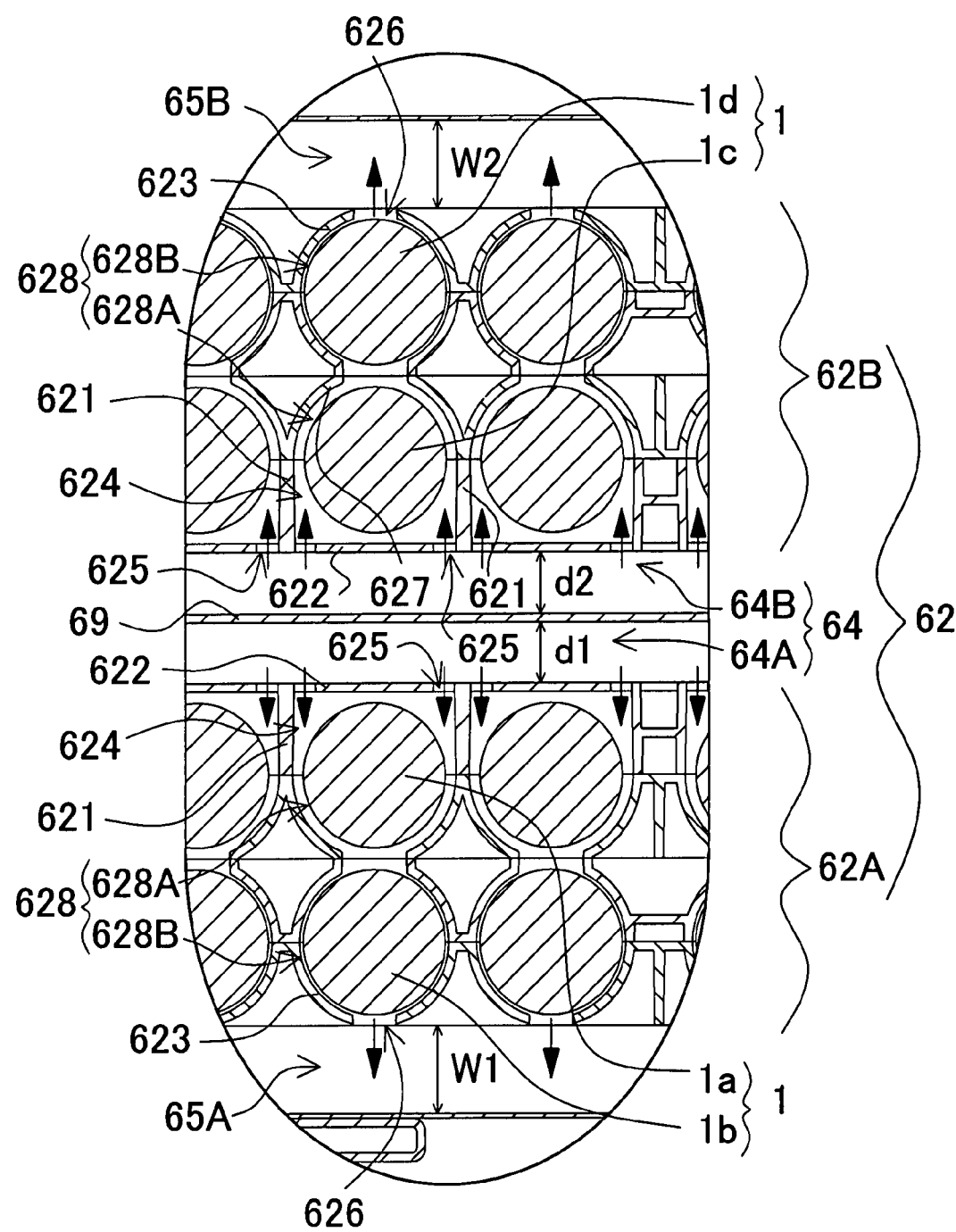
FIG. 11 is an enlarged, cross sectional view of the holder case in the electric power source shown in FIG. 5.
Figure 12:
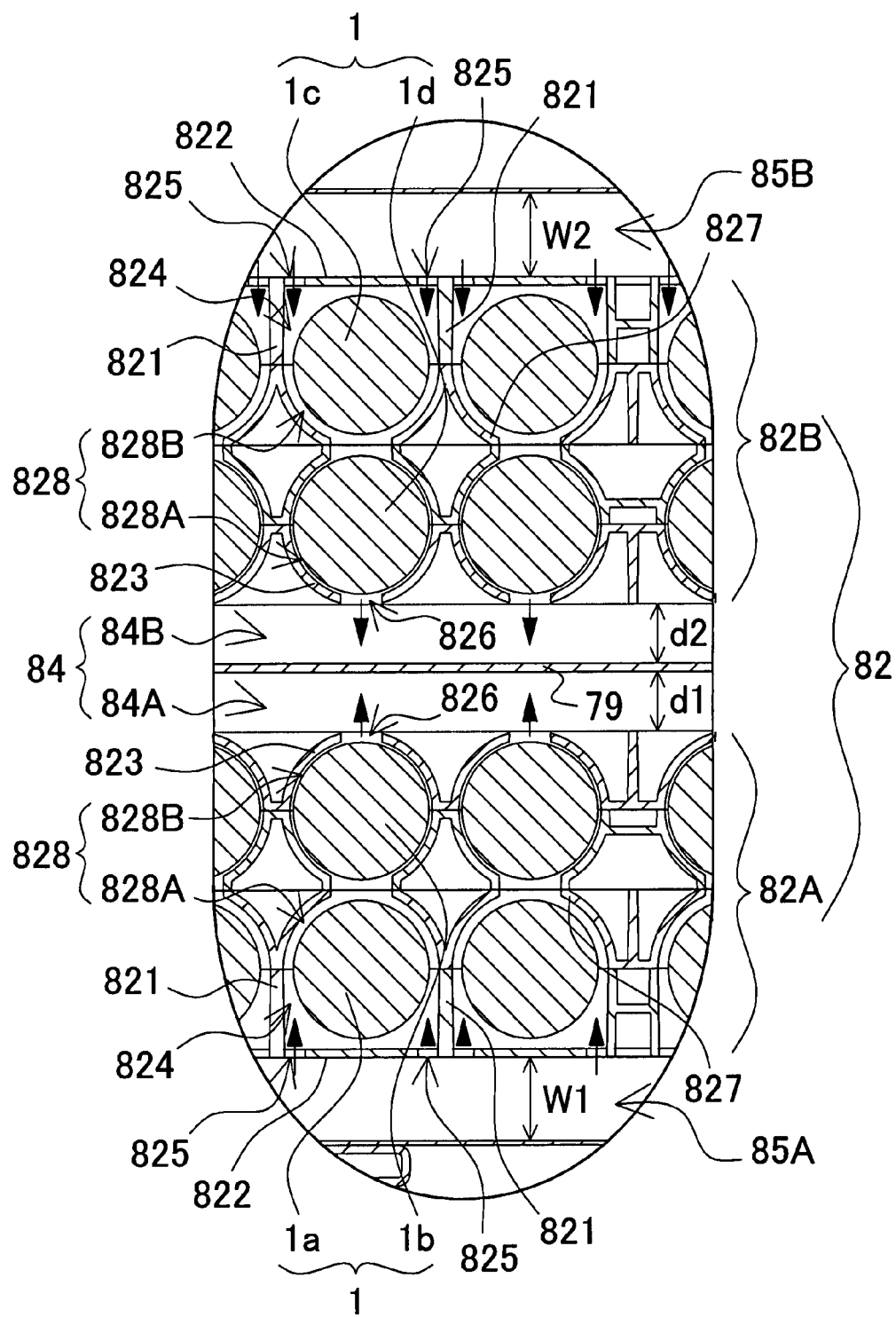
FIG. 12 is an enlarged, cross sectional view of the holder case in the electric power source shown in FIG. 7.

As shown in FIGS. 11 and 12, the first sub holder case 62A, 82A and the second sub holder case 62B, 82B respectively have their interior portion segmented into a plurality of chambers 624, 824 to contain the batteries 1 in respective chambers 624, 824 in a plurality of tiers. While the first sub holder case 62A, 82A and the second sub holder case 62B, 82B contain batteries 1 in a plurality of tiers inside a pair of opposed walls 621, 821, the pair of opposed walls 621, 821 are closed, at the inlet side and the exhaust side, by an inlet wall 622, 822 and an exhaust wall 623, 823, to thus obtain a chamber 624, 824 defined by the pair of opposed walls 621, 821, the inlet wall 622, 822 and the exhaust wall 623, 823, so that the batteries 1 can be contained in the chamber 624, 824.

The first sub holder case 62A, 82A contains a first battery 1a and a second battery 1b in two tiers along the air-blowing direction (from the top to the bottom as viewed in FIG. 11, and from the bottom to the top as viewed in FIG. 12). The second sub holder case 62B, 82B contains a third battery 1c and fourth battery 1d in two tiers along the air-blowing direction (from the bottom to the top as viewed in FIG. 11, and from the top to the bottom as viewed in FIG. 12). The first sub holder case 62A, 82A and the second sub holder case 62B, 82B respectively have an inlet hole 625, 825 and an exhaust hole 626, 826 opened for blowing the cooling air to the batteries 1 thus contained. The cooling air coming from the inlet hole 625, 825 to the holder case 2, 72 is exhausted through the exhaust hole 626, 826 after cooling the batteries 1. The first sub holder case 62A, 82A and the second sub holder case 62B, 82B respectively have the inlet hole 625, 825 opened in the inlet wall 622, 822, and also have the exhaust hole 626, 826 opened in the exhaust wall 623, 823. The inlet hole 625, 825 and the exhaust hole 626, 826 are opened in a position similar to the holder case 2 previously shown in FIG. 9, so that the battery 1 can be uniformly cooled in each tier.

Further, in order to control an air-blowing state in an air-blowing space 628, 828 between the battery 1 in each tier and the opposed wall 621, 821, the interior surface of the opposed wall 621, 821 is provided with a ridge 627, 827 protruding inwardly. The illustrated opposed walls 621, 821 are so curved, at the lateral sides of the ridge 627, 827, as to matingly face the surface of the battery 1. The ridge 627, 827 is so designed as to provide the uniform, air-blowing space 628, 828 with respect to the battery 1, so that the cooling air can be blown smoothly. The illustrated holder case 62, 82 is provided with a first air-blowing space 628A, 828A at the half portion in the leeward, for the first battery 1a and the third battery 1c, and is also provided with a second air-blowing space 628B, 828B on both of the surfaces in the windward and leeward, for the second battery 1b and the fourth battery 1d. With this configuration, the size of area of the air-blowing space 628, 828, for the cooling air to be blown along the surface of the battery 1, is increased from the first air-blowing space 628A, 828A toward the second air-blowing space 628B, 828B.

The holder case 62, 82 shown in FIGS. 5 and 7 is structured with the first sub holder case 62A, 82A and the second sub holder case 62B, 82B to contain the batteries 1 in two tiers, respectively. However, the holder case is so structured that the first sub holder case and the second sub holder case may contain the batteries in three or more tiers respectively, and the first and second sub holder cases may also contain the batteries in the same number of tiers. Although not illustrated, these holder cases should be so structured as to uniformly cool the batteries contained in a multi-tier manner by adjusting the gap in the air-blowing space through altering the height or shape of a plurality of ridges provided in the opposed wall.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-208176 filed in Japan on Jul. 31, 2006, the content of which is incorporated herein by reference.

What is claimed is:
1. An electric power source comprising:
a plurality of batteries;
a battery case in which the plurality of batteries are stacked in two or more tiers, the battery case comprising a holder case, the holder case comprising:
an intermediary duct for conducting cooling air;
a first sub holder case and a second sub holder case, wherein the intermediary duct is disposed between the first sub holder case and the second sub holder case in a direction of stacking the batteries; and an outer duct comprising a first outer duct provided outside the first sub holder case, and a second outer duct provided outside the second sub holder case;

wherein the first sub holder case and the second sub holder case are disposed between the first outer duct and the second outer duct, wherein the intermediary duct is disposed between the first sub holder case and the second sub holder case so that cooling air can be blown to the intermediary duct, the holder case and the outer duct, which are so structured as to cool the batteries contained in the holder case, and wherein a partition is disposed inside the intermediary duct which is divided by the partition into a first intermediary sub duct disposed to the first sub holder case side and a second intermediary sub duct disposed to the second sub holder case side, so that the first intermediary sub duct is linked to the first sub holder case, while the second intermediary sub duct is linked to the second sub holder case, and wherein the first sub holder case contains the batteries in the greater number of tiers than does the second sub holder case, and wherein an inside width in the first intermediary sub duct is larger than an inside width in the second intermediary sub duct.

2. The electric power source as recited in claim 1, wherein the power source is so constructed and arranged that the cooling air is allowed to flow from the intermediary duct through the holder case to be exhausted into the outer duct, so that the batteries contained in the holder case are cooled, wherein the air is blown through the first intermediary sub duct to the first sub holder case, and through the second intermediary sub duct to the second sub holder case.

3. The electric power source as recited in claim 1, wherein the batteries are contained in "m" number of tiers in the first sub holder case and in "n" number of tiers in the second sub holder case, wherein the ratio of the inside width in the first intermediary sub duct to the inside width in the second intermediary sub duct is m to n.

4. The electric power source as recited in claim 3, wherein the batteries are contained in three tiers in the first sub holder case and in two tiers in the second sub holder case, wherein the ratio of the inside width in the first intermediary sub duct to the inside width in the second intermediary sub duct is 3 to 2.

5. The electric power source case as recited in claim 1, wherein the partition is disposed, inside the intermediary duct, in a parallel relationship with respect to a blowing direction of the cooling air.

6. The electric power source as recited in claim 1, wherein each of the first and second sub holder cases contains batteries in a plurality of tiers inside a pair of opposed walls, and the pair of opposed walls are closed, at inlet and outlet sides thereof, by an inlet wall and an exhaust wall to form a chamber that contains the batteries therein, wherein the inlet wall has an inlet hole opened at lateral portions thereof, so that the cooling air coming inwardly through the inlet hole may be blown into a space between the batteries and the opposed walls, wherein the exhaust wall has an exhaust hole at a center portion thereof, so that the cooling air blown along the surface of the batteries may be blown outwardly through the center portion, and wherein each of the pair of opposed walls has a ridge protruding inwardly toward and between the batteries which are disposed adjacently to each other.

7. The electric power source as recited in claim 6, wherein in each of the pair of opposed walls, an inward protruding height of the ridge is higher in a leeward direction than in a windward direction, toward and between the batteries which are disposed adjacently to each other.

8. The electric power source as recited in claim 6, wherein the first sub holder case contains, in the chamber, a first battery, a second battery and a third battery in three tiers in a blowing direction of the cooling air, and wherein each of the pair of opposed walls is provided with a first ridge toward and between the first battery and the second battery, and with a second ridge toward and between the second battery and the third battery, wherein the second ridge is made higher than the first ridge.

9. The electric power source as recited in claim 8, wherein, in each of the opposed walls, both of the lateral surfaces of the second ridge are so curved as to matingly face the surface of a nearest one of the batteries.

10. The electric power source as recited in claim 6, wherein the inner surface in a vicinity of a boundary between the exhaust wall and the pair of opposed walls is so curved as to matingly face the surface of a nearest one of the batteries, with an air-blowing space being provided with respect to the battery.

* * * * *